(12) United States Patent
Sanchez

(10) Patent No.: US 6,859,843 B1
(45) Date of Patent: Feb. 22, 2005

(54) SYSTEMS AND METHODS FOR RECONFIGURING NETWORK DEVICES

(75) Inventor: Ana Silvia Sanchez, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 09/716,771

(22) Filed: Nov. 20, 2000

(51) Int. Cl.[7] .............................................. G06F 15/16
(52) U.S. Cl. ...................... 709/250; 709/201; 709/203; 709/217; 709/220; 709/221; 709/224; 358/1.15
(58) Field of Search ................................ 709/200–310; 358/1.15

(56) References Cited

U.S. PATENT DOCUMENTS

| | | | |
|---|---|---|---|
| 5,671,355 A | | 9/1997 | Collins .................... 395/200.2 |
| 5,692,111 A | * | 11/1997 | Marbry et al. ............. 358/1.15 |
| 5,960,167 A | * | 9/1999 | Roberts et al. ............ 358/1.15 |
| 6,308,205 B1 | * | 10/2001 | Carcerano et al. .......... 709/221 |
| 2002/0049693 A1 | * | 4/2002 | Gase ............................. 707/1 |

* cited by examiner

Primary Examiner—Nabil El-Hady

(57) ABSTRACT

A method for configuring a network device for intercommunication with a network preferably includes the steps of: recording information corresponding to the first network configuration of the network device; determining whether the network device is able to communicate with the network; and, if the network device is not able to communicate with the network, reconfiguring the network device so that a current network configuration of the network device corresponds to the first network configuration. Systems and computer readable media also are provided.

13 Claims, 4 Drawing Sheets

SYSTEMS AND METHODS FOR RECONFIGURING NETWORK DEVICES

BACKGROUND OF THE INVENTION

1. Field of the Invention

The present invention generally relates to network systems and, in particular, to systems and methods for reconfiguring devices, such as printers, for example, that are communicatively coupled to networks.

2. Description of the Related Art

Network systems incorporate various devices, e.g., printers and workstations, among others, that are communicatively coupled to each other. So provided, information may be accessed, distributed, and/or manipulated among and by the various devices of the network. Typically, such a network includes a network operating system, which permits intercommunication between the various network devices.

As is known, when a network device, e.g., a printer, or other device that is able to communicate with a network, is communicatively interconnected to a network, the printer may not be accessed or utilized by other devices of the network until the printer is "registered" with the network. For instance, the printer may transmit a "request" for registration that is intended to be received by an appropriate server. Typically, registration of the printer is facilitated by a system administrator who may access the server, i.e., the server in receipt of the request for registration, and who then may manually register the printer based upon information contained in the request. Once so registered, the various clients of the network may utilize the newly registered printer.

Typically, registration of a printer by a network involves configuring a printer network card of the printer with particular information or properties so that the printer may be properly recognized by the network. Unfortunately, properties of a printer network card may be changed and/or corrupted, such as by being inadvertently changed by an operator, power irregularity, etc., thereby potentially rendering the printer unable to properly communicate with the network. Similarly, other network devices may possess many of the characteristics described hereinbefore in relation to printers, i.e., incorporating network cards and their associated vulnerabilities to being changed and/or corrupted.

Therefore, there is a need for improved systems and methods which address these and other shortcomings of the prior art.

SUMMARY OF THE INVENTION

Briefly described, the present invention relates to network systems and, in particular, to systems and methods for reconfiguring network devices, such as printers, for example, that are communicatively coupled to a network. In a preferred embodiment, the method includes the steps of: recording information corresponding to the first network configuration of a network device; determining whether the network device is able to communicate with the network; and, if the network device is not able to communicate with the network, reconfiguring the network device so that a current network configuration of the network device corresponds to the first network configuration.

Other embodiments of the present invention may be construed as providing computer readable media for configuring network devices. Preferably, such a medium includes logic configured to record information corresponding to the first network configuration of the network device. The medium also includes logic configured to determine whether the network device is able to communicate with the network and logic configured to reconfigure the network device. So provided, if the network device is not able to communicate with the network, the network device may be reconfigured so that a current network configuration of the network device corresponds to the first network configuration.

Still other embodiments of the present invention may be construed as providing a communications network. Preferably, such a network includes a communication interface, a first network device communicatively coupled with the communication interface, and a second network device communicatively coupled with the communication interface. Additionally, the second network device is provided with a first network configuration, thereby enabling the second network device to communicate with the first network device. Moreover, the network is configured to record information corresponding to the first network configuration of the second network device, determine whether the second network device is able to communicate with the first network device, and, if the second network device is not able to communicate with the first network device, reconfigure the second network device so that a current network configuration of the second network device corresponds to the first network configuration.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF A PREFERRED EMBODIMENT

Figure 1:
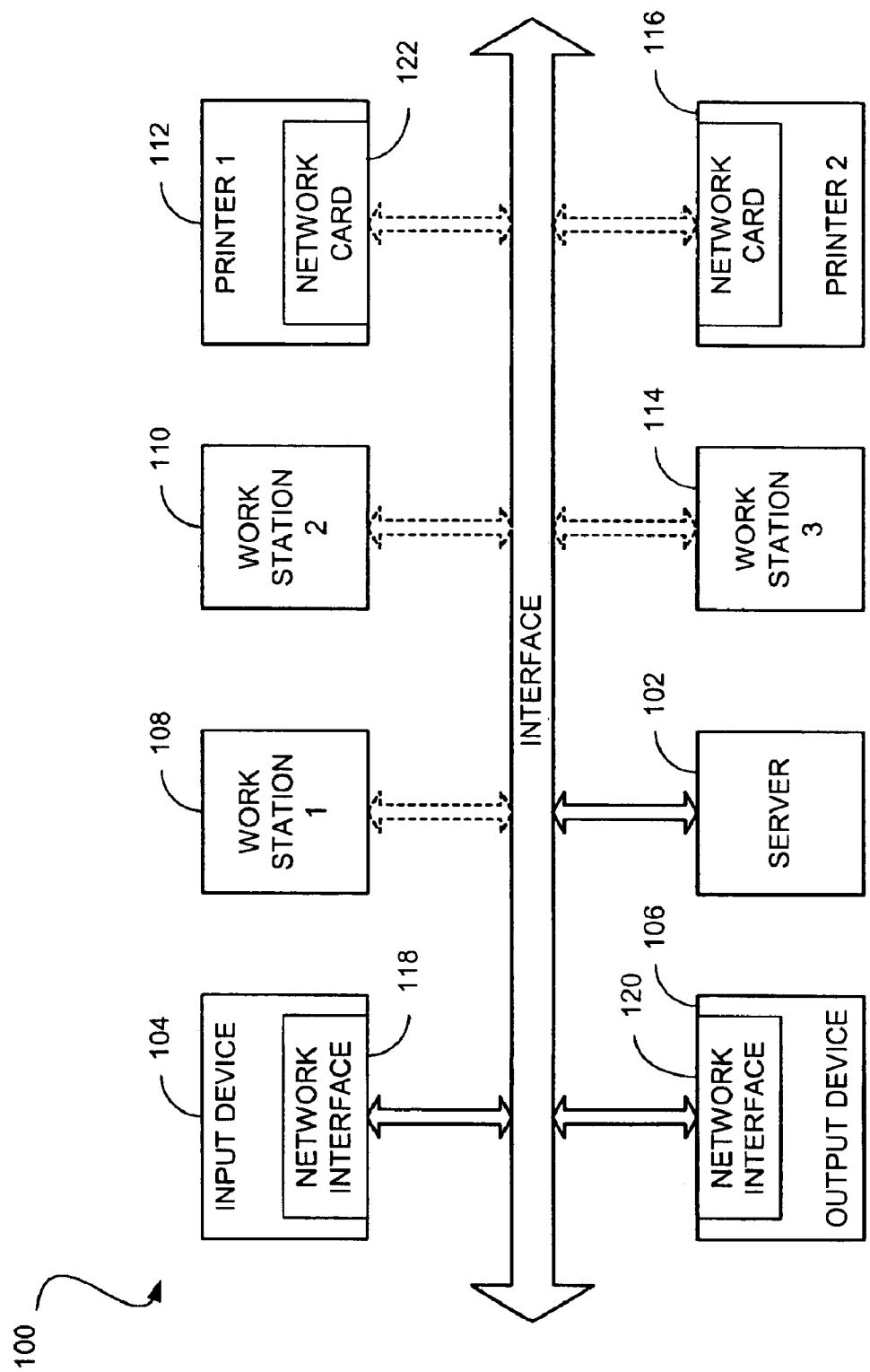
FIG. 1 is a schematic diagram depicting a representative network system.

Reference will now be made in detail to the description of exemplary embodiments of the invention as illustrated in the drawings with like numerals indicating like parts throughout the several views. As shown in FIG. 1, a representative network 100 is depicted. Network 100 may be implemented in a variety of configurations and includes, for example, a server 102, an input device 104, e.g., a workstation, and an output device 106, e.g., a printer. Various other network devices, such as additional workstations (workstations 108, 1 10 and 114, for example) and various other input devices 114 such as, but not limited to, keyboards and scanners, and printers (printers 112 and 116, for example) and various other output devices 116 such as, but not limited to, facsimiles and displays, among others, also may be provided. So configured, the various network devices are presented in a communicatively coupled environment so that clients may intercommunicate via the various devices in accordance with a network protocol.

Typically, the ability of a network device to communicatively couple with a network is facilitated by a network interface, e.g., network interface 118 facilitates communicative coupling of input device 104 with the network, and network interface 120 facilitates communicative coupling of output device 106 with the network. Such an interface, in addition to providing a physical connection to a bus or other portion or device of the network, is configured with various information corresponding to network communication properties of its corresponding network device. In particular, such a network interface may enable the network device associated therewith to transmit a service advertising protocol or SAP over the network that is recognized by the network as a request for registration. Additionally, the network interface stores information which may generally be characterized as address information of the network device.

As mentioned briefly hereinbefore, once a network device and, more specifically, the network interface of the network device, has been configured so that the device may properly communicate with the network, the configuration information or properties stored in the network interface may change or, otherwise, become corrupted, thereby potentially degrading the network device's ability to maintain proper intercommunication with the network. As described in detail hereinafter, the present invention, however, may alleviate this and/or other shortcomings associated with device networking.

The present invention relates to systems and methods for reconfiguring network devices such as, but not limited to, printers, for example, that are configured to communicatively couple to a network. In this regard, some embodiments of the present invention may be construed as providing network device reconfiguration systems, with such systems being implemented in hardware, software, firmware, or a combination thereof. In a preferred embodiment, however, the network device reconfiguration system is implemented as a software package, which can be adaptable to run on different platforms and operating systems as shall be described further herein. In particular, a preferred embodiment of the network device reconfiguration system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. As such, the network device reconfiguration system of the present invention may reside in a network workstation, network server, or on any other device or apparatus which may communicate with the network of interest.

In the context of this document, a "computer-readable medium" can be any means that can contain, store, communicate, propagate or transport the program for use by or in connection with the instruction execution system, apparatus, or device. The computer readable medium can be, for example, but is not limited to, an electronic, magnetic, optical, electromagnetic, infrared, or semi-conductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable marner, if necessary, and then stored in a computer memory.

Figure 2:
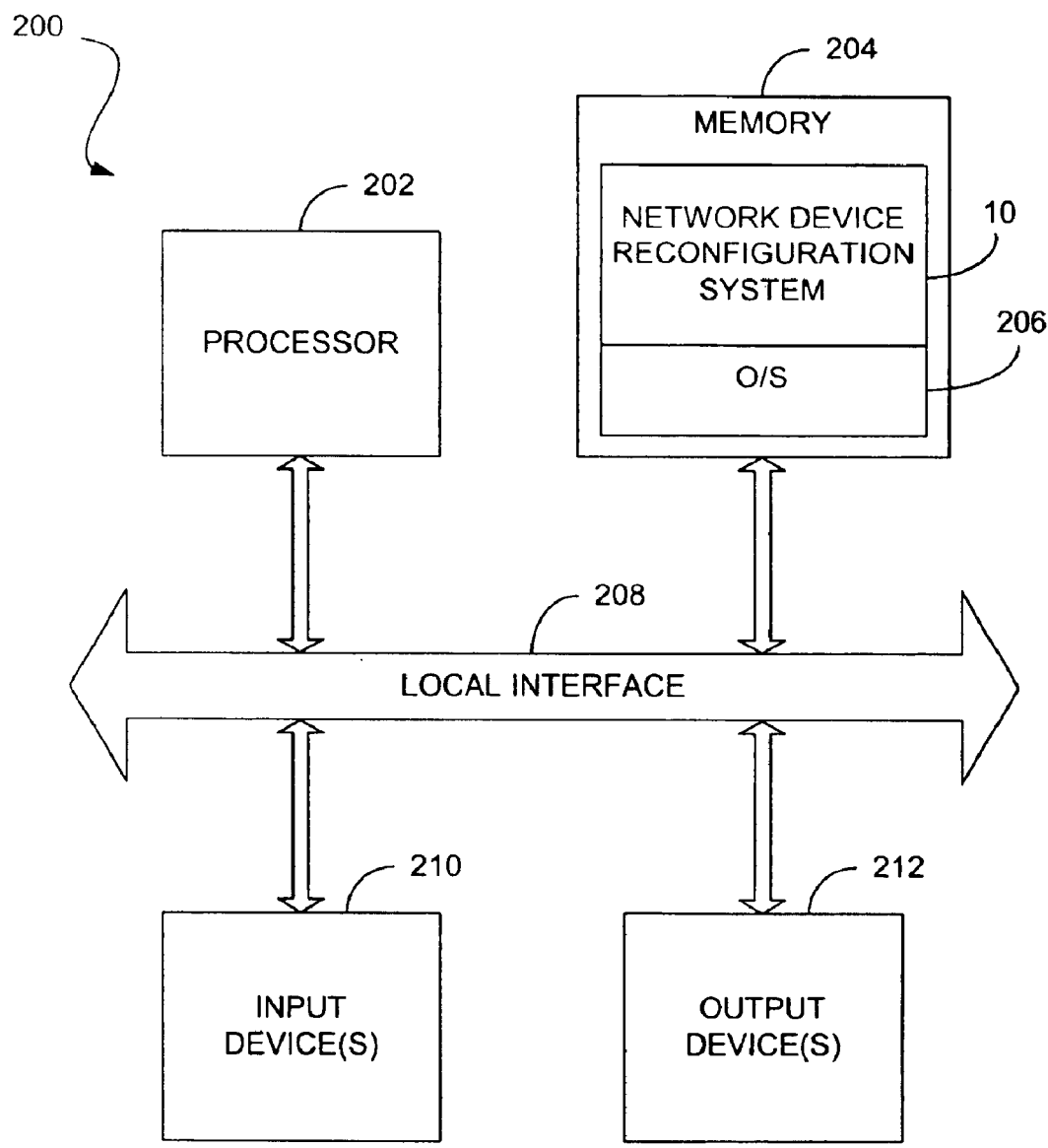
FIG. 2 is a schematic diagram depicting a representative computer or processor-based system.

FIG. 2 illustrates a typical computer or processor-based system 200 which may facilitate the network device reconfiguration system 10 of the present invention. As shown in FIG. 2, a computer system 200 generally comprises a processor 202 and a memory 204 with an operating system 206. wherein, the memory 204 may be any combination of volatile and nonvolatile memory elements, such as random access memory or read only memory. The processor 202 accepts instructions and data from memory 204 over a local interface 208, such as a bus(es). The system also includes an input device(s) 210 and an output device(s) 212. Examples of input devices may include, but are not limited to, a serial port, a scanner, or a local access network connection. Examples of output devices may include, but are not limited to, a video display, a Universal Serial Bus, or a printer port. Generally, this system may run any of a number of different platforms and operating systems, including, but not limited to, HP-ux™, Linux™, Unix™, Sun Solaris™ or Windows NT™ operating systems. The printer reconfiguration system 200 of the present invention, the functions of which shall be described hereinafter, resides in memory 204 and is executed by the processor 202.

Figure 3:
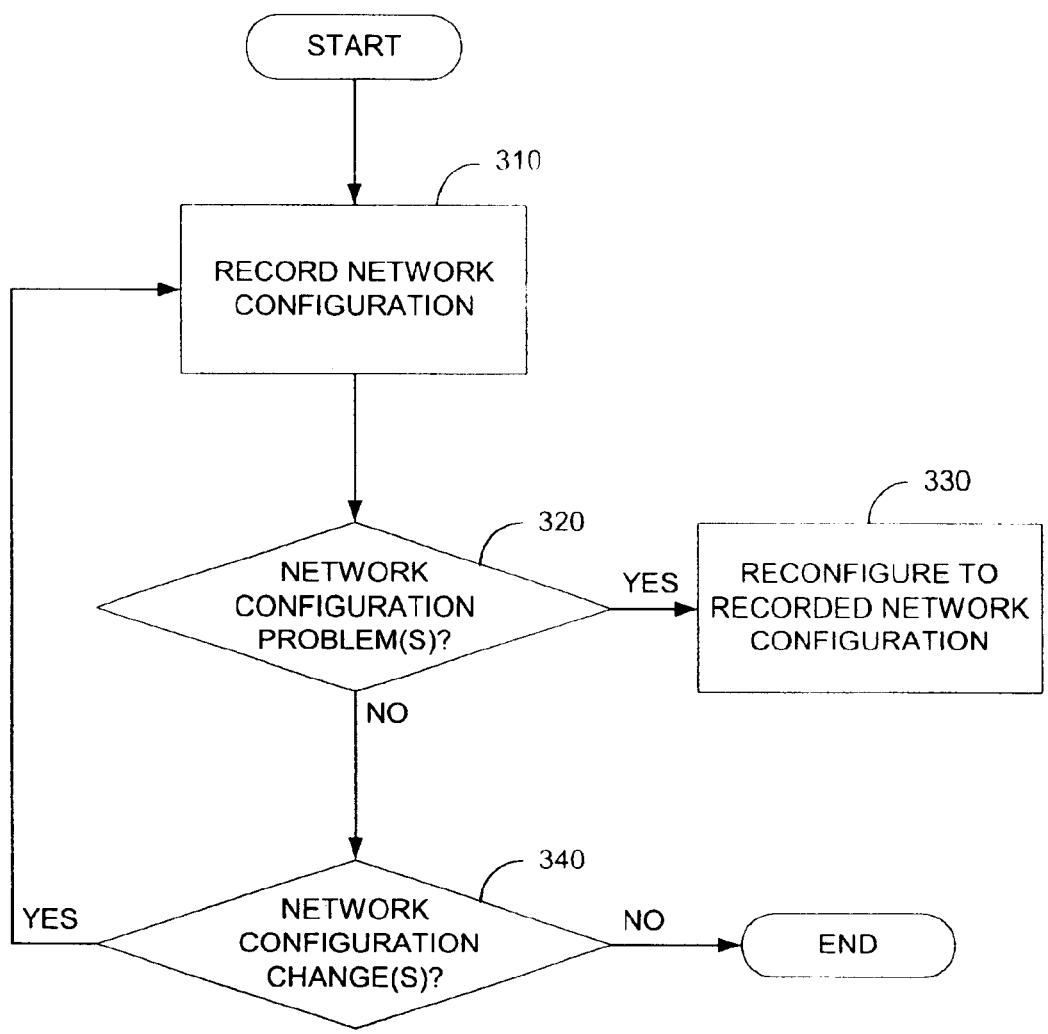
FIG. 3 is a flow chart depicting functionality of a preferred embodiment of the present invention.

The flowchart of FIG. 3 shows the functionality of a preferred implementation of the system 10 depicted in FIG. 2. In this regard, each block of the flowchart represents a module segment or portion of code which comprises one or more executable instructions for implementing the specified logical function or functions. It should also be noted that in some alternative implementations the functions noted in the various blocks may occur out of the order depicted in FIG. 3. For example, two blocks shown in succession in FIG. 3 may, in fact, be executed substantially concurrently where the blocks may sometimes be executed in the reverse order depending upon the functionality involved.

As depicted in FIG. 3, the functionality of a preferred embodiment of the network device reconfiguration system may be construed as beginning at block 310 where the configuration of a network is recorded. In some embodiments, recording of the network configuration may include recording information corresponding to the network configuration, e.g., address information, of a particular network device or various devices of the network. More specifically, the network configuration information recorded by the system may include information typically provided or stored on a corresponding network card(s) of the network device(s). Preferably, the network configuration information is recorded in a file or database that may be in one or more of a variety of locations, provided that such network configuration information is retrievable by the system. So configured, the system may function as repository for storing network configuration information.

After block 310, the process preferably proceeds to block 320 where a determination may be made as to whether there are any network configuration problems, e.g., communication and/or operability problems associated with one or more network devices. Such a determination may be facilitated by an operator input corresponding to the identification of a network configuration error, or may be automatically detected by the system.

If it is determined in block 320 that a network configuration problem exists, the process preferably proceeds to block 330 where the improperly configured network device may be reconfigured. More specifically, the network device may be reconfigured in accordance with the network configuration recorded in block 310. If, however, it is determined that there are no configuration problems, the process may proceed to block 340 where an additional determination may be made as to whether the network configuration has changed, e.g., whether the configuration has changed since being last recorded by the system. If it is determined that the configuration has changed, the process may return to block 310 and, thereafter, proceed as described hereinbefore. In particular, the current configuration of the network, or of a particular device(s) of the network, may be recorded. If, however, it is determined that configuration changes have not occurred, the process may return to block 320, thereby facilitating an automatic problem detection scheme or, alternatively, may end as depicted in FIG. 3.

Utilization of the present invention may facilitate, among others, convenient replacement of network devices. For instance, when a network device is to be replaced, due to upgrading of a device, removal of the device for repair, etc., a replacement network device may be provided which, when communicatively coupled to the network, may be configured by the system. Thus, the replacement device may be configured with the network configuration information that was previously utilized by the replaced device.

Figure 4:
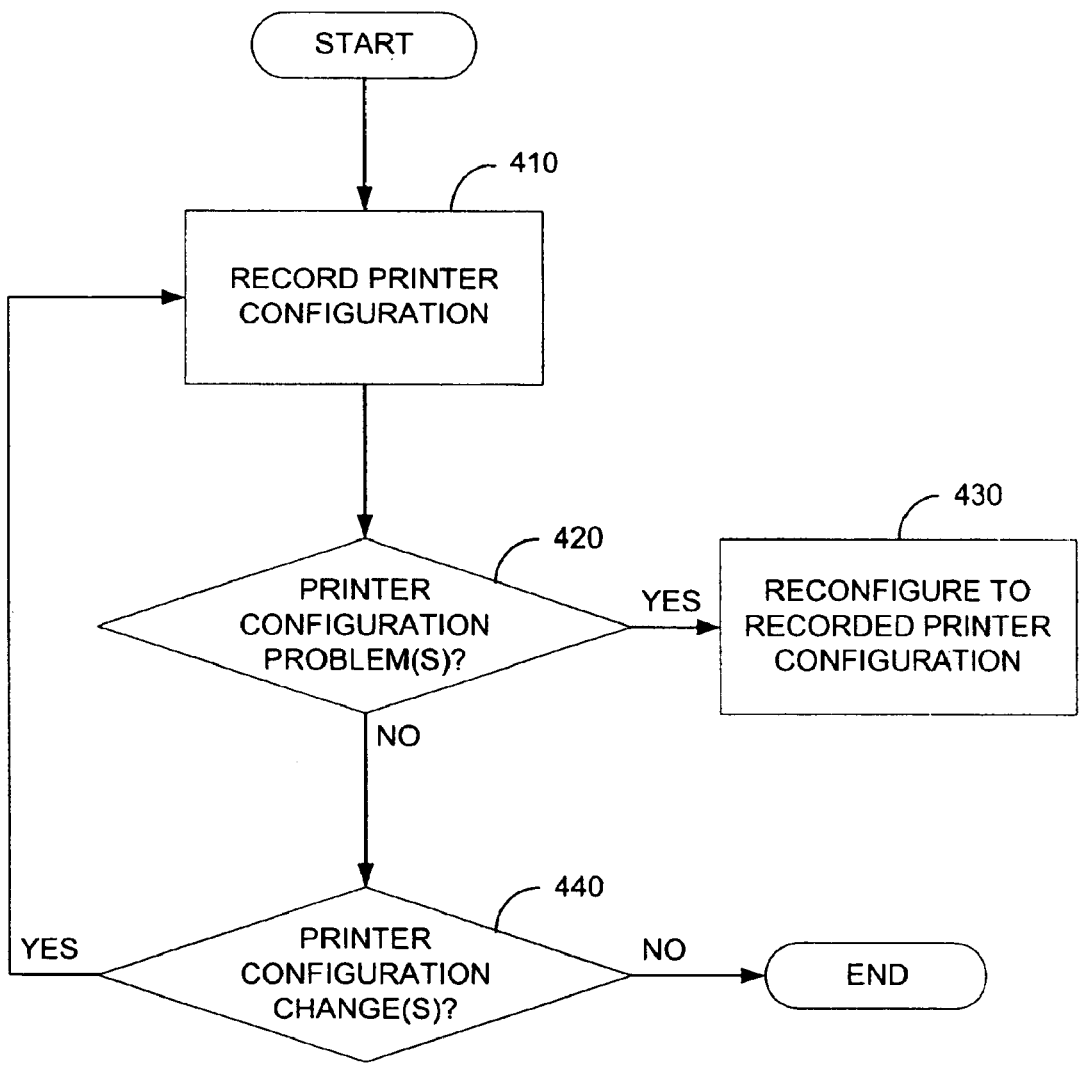
FIG. 4 is a flow chart depicting functionality of a preferred embodiment of the present invention.

Reference will now be made to FIG. 4 which depicts the functionality of a preferred embodiment of the present invention that is adapted to reconfigure printers which are communicatively coupled to a network. As mentioned briefly hereinbefore in relation to network devices in general, typically, the ability of a printer to communicatively couple with a network is facilitated by a network card, e.g., printer 112 is communicatively coupled to the network by network card 122 (FIG. 1). In addition to providing a physical connection to a bus or other portion or device of the network, the printer network card is configured with various information corresponding to network communication properties of that printer, e.g., the network card stores information which may be generally characterized as address information, such as the IP address, of the printer. Once the network card of the printer has been configured so that the printer may properly communicate with the network, the configuration information or properties stored in the network card may change or otherwise become corrupted, thereby potentially degrading the printer's ability to maintain proper intercommunication with the network. As set forth hereinafter, the present invention may alleviate this and/or other shortcomings associated with printer networking.

As depicted in FIG. 4, a preferred embodiment of a printer reconfiguration system may be construed as beginning at block 410 where the printer configuration, and, in particular, information corresponding to the configuration of the printer network card is recorded. Preferably, the configuration information is recorded in a file or database that may be in one or more of a variety of locations, provided that such configuration information is readily retrievable by the printer reconfiguration system. After block 410, the process preferably proceeds to block 420 where a determination is made as to whether there are any configuration problems relating to the printer. For example, such configuration problems may include, but are not limited to, the inability of the network to communicate with the printer and the inability of the printer to communicate with the network, among others. Such a determination may be facilitated by an operator input corresponding to the identification of a configuration error, or may be automatically detected by the printer reconfiguration system.

If it is determined in block 420 that printer configuration problem exists, the process preferably proceeds to block 430 where the improperly configured printer may be reconfigured in accordance with the printer configuration recorded in block 410. If, however, it is determined that there are no configuration problems, the process may proceed to block 440 where an additional determination may be made as to whether the printer configuration has changed, e.g., whether the configuration has changed since being recorded by the printer reconfiguration system. If it is determined that the configuration has changed, the process may return to block 410 and, thereafter, proceed as described hereinbefore. More specifically, the current configuration of the printer network card may be recorded by the printer reconfiguration system. If, however, it is determined that a configuration change has not occurred, the process may end.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A method for configuring a network device for intercommunication with a network, the network device being communicatively coupled with the network and having a first network configuration enabling the network device to communicate with the network, said method comprising:

recording information corresponding to the first network configuration of the network device;

automatically monitoring a current network configuration of the network device; and determining whether the network device is able to communicate with the network such that, if the network device is not able to communicate with the network:

automatically comparing the current network configuration with the information corresponding to the first network configuration;

automatically determining whether the current network configuration corresponds to the first network configuration; and if the current network configuration does not correspond to the first network configuration, automatically reconfiguring the network device such that the current network configuration of the network device corresponds to the first network configuration, thereby enabling the network device to communicate with the network;

wherein, if the network device is able to communicate with the network:

determining whether the current network configuration of the network device corresponds to the first network configuration; and if the current network configuration of the network device does not correspond to the first network configuration, recording the current network configuration as a second network configuration such that, if it is later determined that the network device is not able to communicate with the network, the network device may be reconfigured with the second network configuration.

2. The method of claim 1, wherein information corresponding to the network configuration of the network device is maintained by a network card of the network device.

3. The method of claim 2, wherein reconfiguring the network device comprises reconfiguring the network card of the network device such that a current network configuration of the network device corresponds to the first network configuration.

4. The method of claim 1, wherein the step of determining whether the network device is able to communicate with the network comprises the step of automatically determining whether the network device is able to communicate with the network.

5. The method of claim 1, wherein the network device is a printer.

6. The method of claim 1, wherein the network has a server communicatively coupled thereto, and wherein recording information corresponding to the first network configuration of the network device further comprises storing the information on the server.

7. The method of claim 1, wherein the network has a workstation communicatively coupled thereto, and wherein recording information corresponding to the first network configuration of the network device further comprises storing the information at the workstation.

8. The method of claim 1, further comprising:
maintaining the current network configuration of the network device if the network device is able to communicate with the network.

9. A computer readable medium for configuring a network device for intercommunication with a network, the network device being communicatively coupled with the network and having a first network configuration enabling the network device to communicate with the network, said computer readable medium comprising:
logic configured to record information corresponding to the first network configuration of the network device;
logic configured to monitor a current network configuration of the network device;
logic configured to determine whether the network device is able to communicate with the network such that, if the network device is not able to communicate with the network, the logic:
compares the current network configuration with the information corresponding to the first network configuration;
determines whether the current network configuration corresponds to the first network configuration; and
if the current network configuration does not correspond to the first network configuration, reconfigures the network device such that the current network configuration of the network device corresponds to the first network configuration, thereby enabling the network device to communicate with the network;
logic configured to determine whether the current network configuration of the network device corresponds to the first network configuration; and
logic configured to record the current network configuration as a second network configuration, if the current network configuration of the network device does not correspond to the first network configuration, such that,
if it is determined that the network device is not able to communicate with the network, the network device may be reconfigured with the second network configuration.

10. A network comprising:
a communication interface;
a first network device configured to communicatively couple with said communication interface;
a second network device configured to communicatively couple with said communication interface, said second network device having a first network configuration enabling said second network device to communicate with said first network device;
wherein said network is configured
record information corresponding to the first network configuration of the second network device;
monitor a current network configuration of the second network device; and
determine whether the second network device is able to communicate with the first network device such that, if the second network device is not able to communicate with the first network device, said network:
compares the current network configuration with the information corresponding to the first network configuration;
determines whether the current network configuration corresponds to the first network configuration; and
if the current network configuration does not correspond to the first network configuration, reconfigures the second network device such that the current network configuration of the second network device corresponds to the first network configuration, thereby enabling the second network device to communicate with the first network device;
wherein said network is further configured to:
determine whether current network configuration of the second network device corresponds to the first network configuration; and
if the current network configuration of the second network device does not correspond to the first network configuration, record the current network configuration as a second network configuration such that, if it is determined that the second network device is not able to communicate with said first network device, said second network device is reconfigured with the second network configuration.

11. The network of claim 10, wherein said second network device has a network card associated therewith, said information corresponding to said first network configuration of said second network device being maintained by said network card.

12. The network of claim 10, further comprising:
a server communicatively coupled with said communication interface, wherein said network is configured to record information corresponding to said first network configuration of said second network device and store said information on said server.

13. The network of claim 10, wherein said second network device is a printer.

* * * * *

UNITED STATES PATENT AND TRADEMARK OFFICE
CERTIFICATE OF CORRECTION

PATENT NO. : 6,859,843 B1
DATED : February 22, 2005
INVENTOR(S) : Sanchez

It is certified that error appears in the above-identified patent and that said Letters Patent is hereby corrected as shown below:

Column 8,
Line 15, after "configured", insert -- to: --.

Signed and Sealed this

Thirteenth Day of December, 2005

JON W. DUDAS
*Director of the United States Patent and Trademark Office*